(No Model.)
H. HUGUENIN.
HAIR SPRING COLLET AND STUD.
No. 384,166. Patented June 5, 1888.
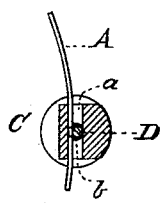
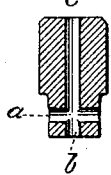
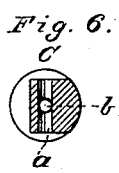
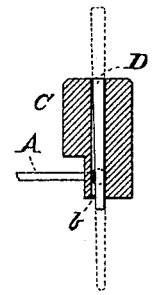
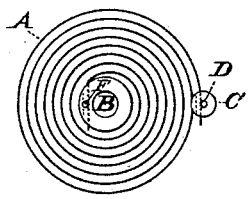
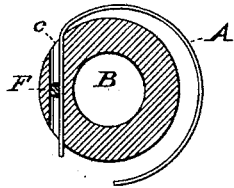
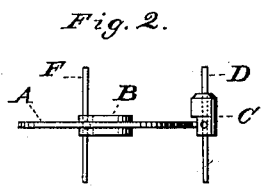
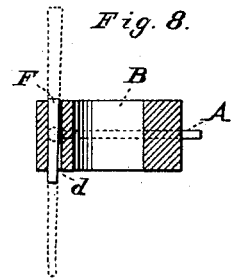
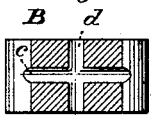
WITNESSES.
Villette Anderson.
J. R. Ferguson.
INVENTOR.
Henry Huguenin,
by E. W. Anderson,
Attorney.

(No Model.)
H. HUGUENIN.
HAIR SPRING COLLET AND STUD.
No. 384,166. Patented June 5, 1888.
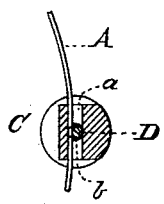
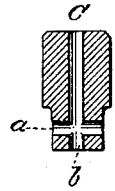
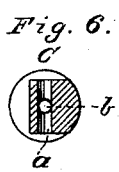
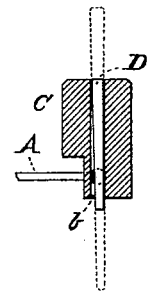
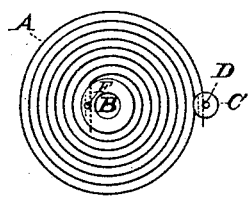
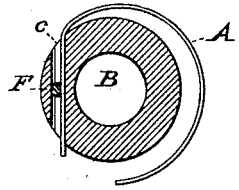
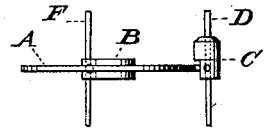
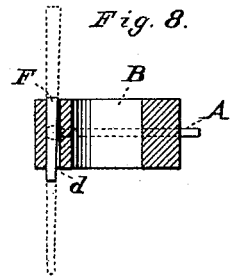
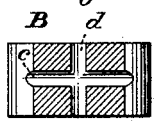
WITNESSES.
Villette Anderson.
J. R. Ferguson.
INVENTOR.
Henry Huguenin,
by E. W. Anderson,
Attorney.